United States Patent [19]
Wilke

[11] Patent Number: 5,779,290
[45] Date of Patent: Jul. 14, 1998

[54] PET HYGIENE MANAGEMENT APPARATUS AND METHOD

[76] Inventor: James A. Wilke, S76 W12620 McShane Dr., Muskego, Wis. 53150

[21] Appl. No.: 791,254

[22] Filed: Jan. 30, 1997

Related U.S. Application Data

[63] Continuation-in-part of Ser. No. 625,703, Apr. 3, 1996, Pat. No. 5,620,221.

[51] Int. Cl.⁶ .......................... A01K 29/00; E01H 1/12
[52] U.S. Cl. .......................................................... 294/1.5
[58] Field of Search ........................ 294/1.3–1.5, 19.1, 294/55; 15/257.1, 257.6; 119/161, 802–804; 248/95, 99–101

[56] References Cited

U.S. PATENT DOCUMENTS

| | | | |
|---|---|---|---|
| 3,777,708 | 12/1973 | Vogt | 119/1 |
| 3,977,422 | 8/1976 | Cabaluna | 135/66 |
| 3,984,139 | 10/1976 | Battaglia | 294/19 R |
| 4,003,595 | 1/1977 | Fano et al. | 294/19 R |
| 4,012,067 | 3/1977 | Travis | 294/19 R |
| 4,335,678 | 6/1982 | Garza et al. | 119/1 |
| 4,502,417 | 3/1985 | Jenkins | 119/95 |
| 5,131,704 | 7/1992 | Sze-Yee | 294/1.4 |
| 5,178,099 | 1/1993 | Lapps et al. | 119/166 |
| 5,178,100 | 1/1993 | Monk | 119/168 |
| 5,178,426 | 1/1993 | David | 294/1.3 |
| 5,193,870 | 3/1993 | MacInnis et al. | 294/1.4 |
| 5,236,237 | 8/1993 | Schultz | 294/1.4 |
| 5,290,080 | 3/1994 | Yoshioka | 294/1.5 |
| 5,315,960 | 5/1994 | Lamp | 119/95 |
| 5,344,200 | 9/1994 | Yoshioka | 294/1.5 |
| 5,386,801 | 2/1995 | Chinn et al. | 119/95 |
| 5,386,802 | 2/1995 | Hang-Fu | 119/95 |
| 5,394,835 | 3/1995 | Gatta | 119/170 |
| 5,396,864 | 3/1995 | Manushcreck | 119/174 |
| 5,403,050 | 4/1995 | Searing et al. | 294/1.5 |
| 5,427,059 | 6/1995 | Logan | 119/95 |

*Primary Examiner*—Johnny D. Cherry
*Attorney, Agent, or Firm*—James A. Wilke

[57] ABSTRACT

An apparatus and method for pet hygiene management that facilitates the collecting and disposing of pet excrement. The present invention comprises a tube assembly with a plurality of bands at one end for holding, opening and closing a receptacle into which pet excrement is deposited. The opening and closing of such receptacle is facilitated by a pair of sliders that are attached to the respective bands and which sliders are coaxially and reciprocally slidingly mounted on the tube. The apparatus can also be provided with a positioning support and wheel assembly that facilitates the placement and positioning of the receptacle near the pet during the use of the apparatus.

11 Claims, 3 Drawing Sheets

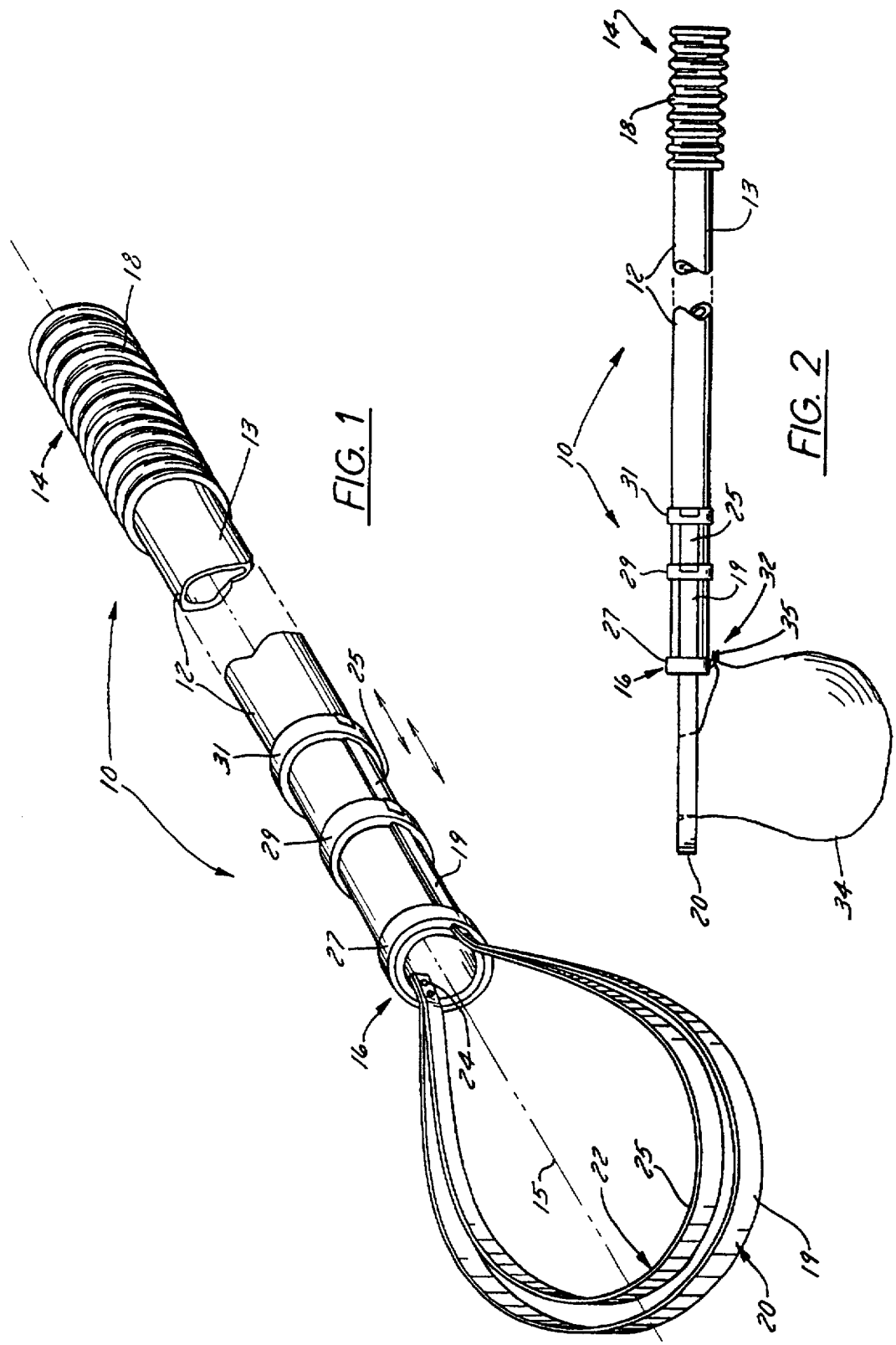

PET HYGIENE MANAGEMENT APPARATUS AND METHOD

RELATED APPLICATIONS

This Application is a continuation-in-part of prior copending U.S. application Ser. No. 08/625,703, filed Apr. 3, 1996 now U.S. Pat. No. 5,620,221.

FIELD OF INVENTION

The present invention relates to an apparatus and method for pet hygiene management and specifically for the collecting and disposing of pet excrement in a convenient and sanitary way.

BACKGROUND OF THE INVENTION

A pet owner, in addition to being responsible for the pet, is responsible for cleaning up after the pet. The usual household pet is either a cat or a dog. In either case the excrement from such pet must or should be collected and properly disposed of by the pet owner or pet caretaker. Many municipalities and private governing bodies, such as condominium associations have ordinances and rules concerning the cleaning up of pet excrements. At best such responsibility is not pleasant and if not done right, besides being messy, can also be unhealthful.

Prior art devices and methods address the clean-up problem in several ways. Housings or boxes, such as U.S. Pat. Nos. 5,394,835, 5,178,100, or 5,178,099 require the pet to enter some portion of the housing or box prior to its use. Such devices require extensive training of the pet as well as space requirements for the apparatus itself. Another device is a pad laid on the ground or other suitable surface upon which the pet deposits its excrement as disclosed in U.S. Pat. No. 5,178,426. The pad is then folded and disposed of by the pet caretaker. This device, although more portable than the box or housing, still requires the pet to be trained to stand on the pad to use it. A third solution to the pet clean-up problem is the "pouch and harness" device. Such device entails the use of a harness assembly that holds a pouch over or near the pet's anal opening for the collection of pet excrement. Such devices are disclosed in U.S. Pat. Nos. 4,502,417, 5,315,960, 5,386,802, 5,386,801, and 5,427,059. Such devices require the pet caretaker to affix the harness to the pet each time that the device is to be used; in other words, each time the pet is going to excrete. The alternative to watching the pet for signs of the devices's need is to leave the harness assembly on the pet at all times. In addition, the pet has to be trained to accept the usage of the harness.

The prior art devices and methods do not fill the need for a lightweight, easily used pet excrement collection device that does not require pet training, can be used without attaching any assembly or apparatus to the pet, can be used anywhere the pet and the pet caretaker are together. The prior art devices and methods do not facilitate the disposal of pet excrement in a clean, convenient, sanitary and efficient manner.

SUMMARY OF THE INVENTION

The present invention provides an apparatus and method for pet hygiene management that facilitates the collecting and disposing of pet excrement. The present invention comprises a tube assembly with a plurality of bands at one end for holding, opening and closing a receptacle into which pet excrement is deposited. The pet caretaker, prior to taking its pet for a walk, attaches a receptacle, such as a plastic storage bag, to the present invention. An outer loop slider on the tube is moved to a first position which opens a loop at the distal end of the tube. The receptacle is placed between a first and second band which forms the loop. The slider is then moved to a position which closes the first band against the second band of the loop thereby pinching the receptacle between the two bands. Another portion of the receptacle is engaged by a receptacle attachment device on the tube thereby maintaining the receptacle in an open position. The pet caretaker positions the tube with the open receptacle at or near the pet's anal opening when the pet assumes the position typically exhibited by pets during the excretion process. The pet deposits its excrement into the open receptacle without any portion of the apparatus touching the pet. The arrangement can take place at any place convenient for the pet and the pet caretaker. Further, the pet does not have to be trained for the present invention to be used effectively. When the pet is finished, the pet caretaker moves the slider to a third position. That step closes the loop and effectively closes the receptacle. The pet caretaker can then fasten a wire twist to secure the receptacle closed or use another appropriate closure. The receptacle can then be properly deposited in a sanitation depository without the pet caretaker handling the pet excrement.

Another embodiment of the present invention utilizes prongs and slots in the first and second band to facilitate the securing of the receptacle in the loop.

Another embodiment of the present invention utilizes a wheel assembly, removably attachable to the tube assembly to facilitate the movement, placement and positioning of the tube into its useful position.

An important feature of the present invention is that it can be used at any time without first attaching any assembly to the pet.

Another important feature of the present invention is that the pet caretaker does not have to handle the pet excrement at any time during the use of the apparatus for collecting pet excrement thereby maintaining a clean and sanitary condition.

An additional feature of the present invention is that it can be used without any special training needed for the pet.

Additionally, the present invention is light-weight, portable, needs no special storage or space requirement and is environmentally useful.

Other principal features and advantages of the invention will become apparent to those skilled in the art upon review of the following drawings, the detailed description and the appended claims.

BRIEF DESCRIPTION OF THE DRAWINGS

A more complete understanding of the invention may be obtained from the following detailed description in conjunction with the accompanying drawings of the embodiment in which:

FIG. 1. is a perspective view of the apparatus of the present invention.

FIG. 2. is a side view of the apparatus of the present invention.

Figure 1A:
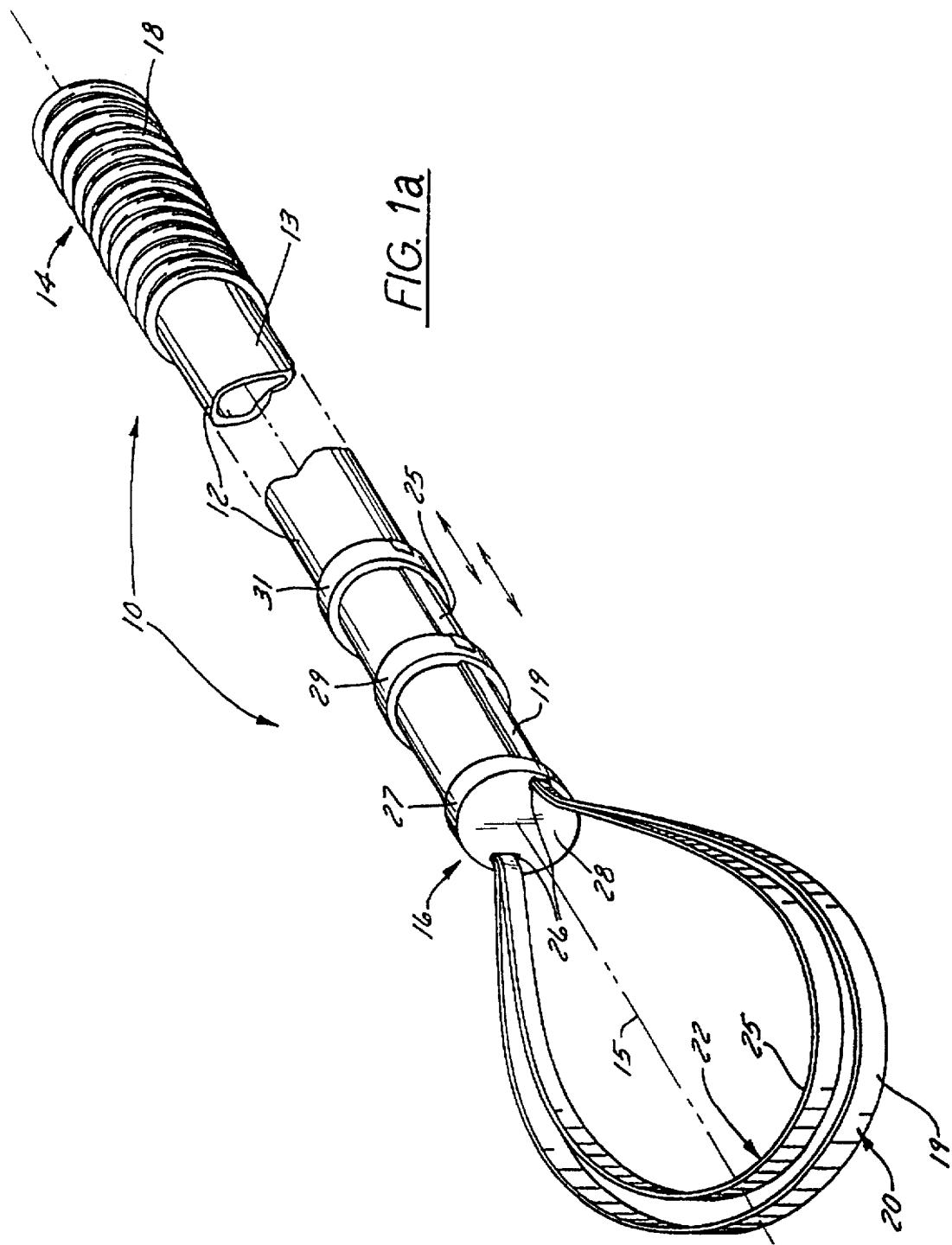
FIG. 1a. is a partial perspective view of the apparatus showing an end cap embodiment of the present invention.

Before explaining the preferred embodiment of the invention in detail it is to be understood that the invention is not limited in its application to the details of construction and the arrangement of the components set forth in the following description as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF PREFERRED EMBODIMENT

Referring now to FIG. 1 and FIG. 2, there is shown an apparatus 10 for collecting and disposing of pet excrement. The apparatus 10 includes a tube 12, having a distal end 16, a proximal end 14, a side wall 13 and a longitudinal axis 15. The proximal end 14 provides a handle 18 to facilitate maneuvering of the apparatus 10. The tube 12 may be of any convenient material but should be light weight, relatively stiff and at least partially hollow to facilitate the operative method of the apparatus 10 as will be explained below. The tube 12 can be made from an aluminum, fiberglass or other composite material, as well as a natural material such as bamboo. The cross section of the tube 12 may be of any convenient shape; however, the applicant believes the best mode to practice the present invention is with a round or circular cross section for the tube 12. The sidewall 13 of the tube 12 can be of any convenient thickness. The distal end 16 of the tube 12 is provided with either a loop guide 27 or an end cap 28. One embodiment provides an integral loop guide 27 and end cap 28 as one piece. The end cap is provided with at least one end cap slot 26 to guide the first and second bands 19,25, as described below.

The first band 19 has one end attached by an attachment means 24 to the tube 12 at the distal end 16, preferably inside the tube and the other end of the first band 19 is looped back to the tube 12 through either the loop guide 27 or the end cap slot 26 of the end cap 28 thereby forming an outer loop 20. Such other end is attached to an outer loop slider 29 with said outer loop slider reciprocally and slidingly mounted on and coaxial with the longitudinal axis 15 of the tube 12. The second band 25 has one end attached by the attachment means 24 to the tube 12 at the distal end 16, preferably inside the tube and the other end of the second band 25 is looped back to the tube 12 through either the loop guide 27 or end cap slot 26 of the end cap 28 thereby forming an inner loop 22. Such other end is attached to an inner loop slider 31 with said inner loop slider 31 reciprocally and slidingly mounted on and coaxial with the longitudinal axis 15 of the tube 12. The second band 25 is positioned inside the outer loop 20 formed by the first band 19. Both the first band 19 and the second band 25 can be pulled along the tube 12 or pushed out along the tube 12 by moving the respective outer loop slider 29 and the inner loop slider 31 to an open or closed position. The attachment means 24 attaches each band 19, 25 to the tube. The attachment means may be any convenient means such as rivets, nuts and bolt, weld, glue or epoxy. An alternative embodiment of the present invention has the first band 19 and the second band 25 attached to the end cap 28.

Figure 4:
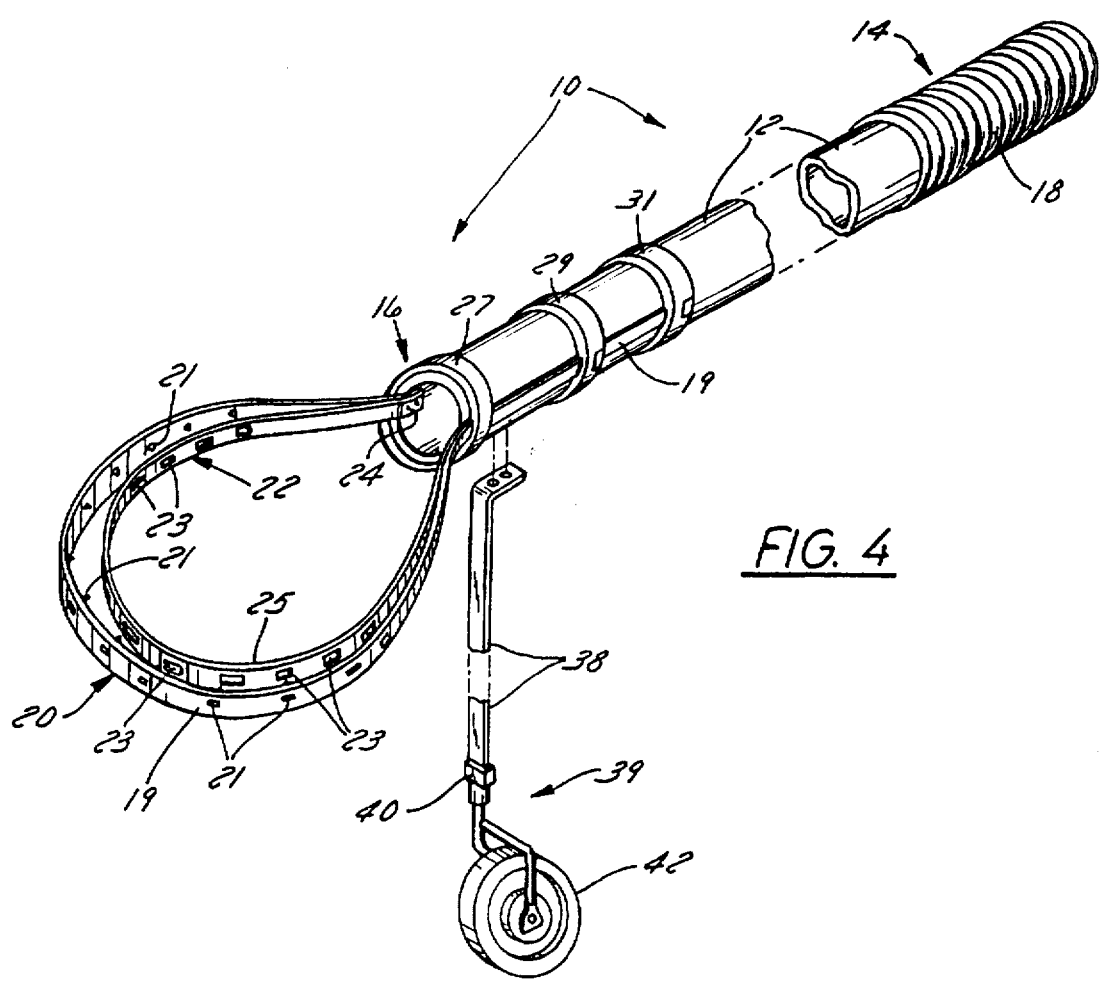
FIG. 4. is a side view of the apparatus of the present invention with a removably attachable wheel assembly.
Figure 3A:
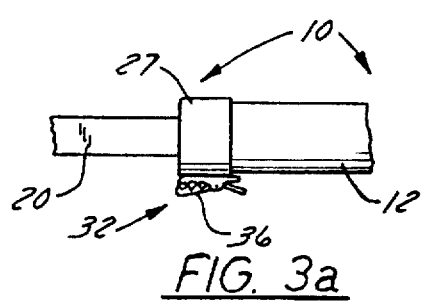
FIG. 3a. is a partial side view of the apparatus of the present invention with another embodiment of the receptacle attachment device, namely a clip/clamp.
Figure 3B:
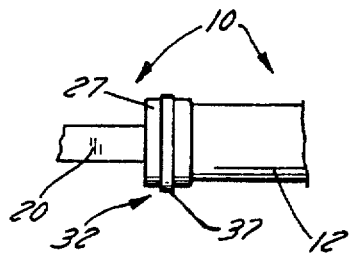
FIG. 3b. is a partial side view of the apparatus of the present invention with another embodiment of the receptacle attachment device, namely a band.

A receptacle 34, typically a bag, is pinched between the outer loop 20 and the inner loop 22 and further attached to the apparatus 10 by a receptacle attachment device 32 such as a hook 35, clamp/clip 36 and band 37. See FIGS. 2, 3a and 3b. With the receptacle 34 pinched between the outer loop 20 and the inner loop 22 and attached to the receptacle attachment device 32, the receptacle 34 is held open to receive the excrement from the pet when the looped receptacle 34 is placed in position near the anal opening of the pet. The receptacle 34 can be of any suitable size and construction, such as a paper bag or a plastic storage bag. An alternative embodiment of the first band 19 and second band 25 has a plurality of prongs 21 and corresponding slots 23 to facilitate the engagement of the receptacle 34 and prevent slippage of the receptacle 34. FIG. 4 shows the prongs 21 on the first band 19 and the corresponding slots 23 in the second band 25; however, it should be understood that either band may support the prongs 21 and the other band have the corresponding slots 23.

In operation, a method for collecting pet excrement comprises carrying the apparatus 10 which is the present invention. Extending from the apparatus a first band 19 by way of moving an outer loop slider 29, slidingly along the longitudinal axis of the tube 12 to a first position. Extending from the apparatus a second band 25 by way of moving an inner loop slider 31, slidingly along the longitudinal axis of the tube 12 to a second position. Attaching one part of a receptacle 34 to a receptacle attachment means 32 fixed to the distal end 16 of a tube 12 of the apparatus 10 and engaging another part of the receptacle, by pinching, between a first band 19 and a second band 25 to hold the receptacle 34 in an open position. Following a pet to a point where the pet excretes excrement. Positioning the apparatus, with the open, attached receptacle beneath the anal opening of the pet until the pet has completed depositing its excrement. Retracting the outer loop slider 29 and inner loop slider 31 to a position to close the receptacle 34. Securing the receptacle in a closed position and depositing the closed, excrement containing receptacle in a sanitation depository.

FIG. 4 illustrates an alternative embodiment which includes a positioning support 38. The positioning support 38 is removably attached to the tube 12 near the distal end 16. The attachment of the positioning support 38 can be by any convenient manner such as a clip, screws, bolts, slide lock or the like. The positioning support 38 is made of a resilient material that facilitates placement and positioning of the open receptacle 34 near the pet. This will be particularly true if the operator of the apparatus 10 is an elderly person, disabled person or a child.

A wheel assembly 39, including a wheel support 40 and a wheel 42, can be removably attachable to the positioning support 38 to further assist in the positioning of the apparatus 10 during its use. The wheel 42 may be a caster wheel.

Thus, it should be apparent that there has been provided in accordance with the present invention an apparatus and method for pet hygiene management for collecting and disposing of pet excrement that satisfies the objectives and advantages set forth above. Although the invention has been described in conjunction with specific embodiments thereof, it is evident that many alternatives, modification and variations will be apparent to those skilled in the art. Accordingly, it is intended to embrace all such alternatives, modifications and variations that fall within the spirit and broad scope of the appended claims.

I claim:

1. An apparatus for collecting pet excrement comprising:
   a tube having a longitudinal axis, with said tube having a distal end and a proximal end,
   a first band having two ends with one end attached to the distal end of the tube, a second band having two ends with one end attached to the distal end of the tube, an outer loop slider coaxial with the longitudinal axis of the tube and slidingly mounted on the tube near the distal end and attached to the other end of the first band, an inner loop slider coaxial with the longitudinal axis of the tube and slidingly mounted on the tube near the distal end and attached to the other end of the second band, a loop guide attached to the distal end of the tube to guide the first and second bands, a receptacle attachment attached to the distal end of the tube, and a receptacle supported by the receptacle attachment and engaged between the said first and second bands.

2. The apparatus of claim 1 including an end cap attached to the distal end of the tube and coaxial with the longitudinal axis of the tube to guide the first and second bands, said end cap having at least one end cap slot.

3. The apparatus of claim 1 wherein the first band has a plurality of prongs and the second band has a plurality of slots corresponding to the prongs in the first band.

4. The apparatus of claim 1 wherein the second band has a plurality of prongs and the first band has a plurality of slots corresponding to the prongs in the second band.

5. The apparatus of claim 1 wherein the receptacle attachment is selected from a group comprising a hook, clamp/clip, and band.

6. The apparatus of claim 1 including a positioning support removably attached to the tube near the distal end.

7. The apparatus of claim 6 including a wheel assembly removably attached to the positioning support, with the wheel assembly including a wheel support and a wheel.

8. The apparatus of claim 7 wherein the wheel is a caster wheel.

9. A method for collecting pet excrement comprising:

carrying an apparatus for collecting pet excrement, extending from the apparatus a first band by way of an outer loop slider slidingly along the longitudinal axis of the tube of the apparatus to a first position, extending from the apparatus a second band by way of an inner loop slider slidingly along the longitudinal axis of the tube of the apparatus to a second position, attaching one part of a receptacle to a receptacle attachment device fixed to the distal end of a tube of the apparatus and engaging another part of the receptacle between the first band and the second band to hold the receptacle in an open position, following a pet to a point where the pet excretes excrement, positioning the apparatus, with the open, attached receptacle beneath the anal opening of the pet until the pet has completed depositing its excrement, retracting the outer and inner sliders,to close the receptacle, securing the closure of the receptacle, and depositing the closed, excrement containing receptacle in a sanitation depository.

10. The method of claim 9 including the step of attaching a positioning support to the tube near the distal end of the tube.

11. The method of claim 9 including the step of attaching a wheel assembly to the positioning support.

* * * * *